United States Patent
Su et al.

(10) Patent No.: US 11,195,413 B1
(45) Date of Patent: Dec. 7, 2021

(54) METHOD FOR RELAYING EVENT INFORMATION IN A MULTI-TIER V2X SYSTEM

(71) Applicant: Hong Kong Applied Science And Technology Research Institute Co., Ltd., Shatin (HK)

(72) Inventors: Dongzhe Su, Shenzhen (CN); Hang Chen, Kowloon Bay (HK); Siu Ping Chan, Kornhill (HK); Ka Ho Mui, Kowloon (HK)

(73) Assignee: Hong Kong Applied Science and Technology Research Institute Co., Ltd, Shatin (HK)

( * ) Notice: Subject to any disclaimer, the term of this patent is extended or adjusted under 35 U.S.C. 154(b) by 0 days.

(21) Appl. No.: 16/882,589

(22) Filed: May 25, 2020

(51) Int. Cl.
*G08G 1/133* (2006.01)
*G08G 1/0967* (2006.01)
(Continued)

(52) U.S. Cl.
CPC ...... *G08G 1/096783* (2013.01); *G08G 1/0116* (2013.01); *G08G 1/0133* (2013.01); *H04L 67/12* (2013.01); *H04W 4/44* (2018.02)

(58) Field of Classification Search
CPC .......... G08G 1/096783; G08G 1/0133; G08G 1/0116; G08G 1/00; G08G 1/01; G08G 1/0104; G08G 1/0108; G08G 1/012; G08G 1/0129; G08G 1/0141; G08G 1/164; G08G 1/165; G08G 1/166; G08G 1/22; H04W 4/44; H04L 67/12
See application file for complete search history.

(56) References Cited

U.S. PATENT DOCUMENTS

| 10,433,120 B2 | 10/2019 | Dizdarevic et al. |
| 2016/0028935 A1 | 1/2016 | El-Ghoroury et al. |

(Continued)

FOREIGN PATENT DOCUMENTS

| CN | 110800324 A | 2/2020 |
| CV | 108064450 A | 5/2018 |

(Continued)

OTHER PUBLICATIONS

International Search Report and Opinion; PCT/CN2020/092438;dated Dec. 25, 2020.

*Primary Examiner* — Hai Phan
*Assistant Examiner* — Anthony D Afrifa-Kyei

(57) ABSTRACT

A method for improving road safety of a vehicle in a system having a plurality of communicatively connected roadside units (RSUs) placed within a defined geographical area, each RSU configured to receive data from a plurality of sources located within its respective coverage area forming part of said defined geographical area and to at least transmit the received data and/or data derived from the received data to one or more data processing units located within its coverage area. The method has the steps of: receiving data defining an event $E_1$ occurring within the coverage area of an event RSU; determining a type of the event $E_1$; and based on the type of event $E_1$, communicating data defining the event $E_1$ or data related to the event $E_1$ from the event RSU to one or more selected RSUs from remaining RSUs.

16 Claims, 8 Drawing Sheets

(51) Int. Cl.
*H04W 4/44* (2018.01)
*G08G 1/01* (2006.01)
*H04L 29/08* (2006.01)

(56) References Cited

U.S. PATENT DOCUMENTS

| | | | |
|---|---|---|---|
| 2017/0098373 A1* | 4/2017 | Filley | G08G 1/096708 |
| 2018/0213365 A1 | 7/2018 | Yi et al. | |
| 2019/0311616 A1* | 10/2019 | Jin | G08G 1/096783 |
| 2020/0242930 A1* | 7/2020 | Ran | G08G 1/123 |

FOREIGN PATENT DOCUMENTS

| | | |
|---|---|---|
| WO | 2017014514 A1 | 1/2017 |
| WO | 2017133769 A1 | 8/2017 |

\* cited by examiner

METHOD FOR RELAYING EVENT INFORMATION IN A MULTI-TIER V2X SYSTEM

RELATED APPLICATION

Applicant's pending U.S. Ser. No. 16/364,399 filed on 26 Mar. 2019 and entitled "A System and a Method for Improving Road Safety and/or Management" describes the architecture and operation of a multi-tier Vehicle-to-Everything (V2X) system, the content of which is incorporated herein by reference.

FIELD OF THE INVENTION

The invention relates to a method for improving road safety and/or management and, more particularly, but not exclusively, to a method for relaying event information in a V2X system.

BACKGROUND OF THE INVENTION

V2X is a vehicular communication system configured to deliver information from a vehicle to any entity that may affect the vehicle, and vice versa. The system incorporates other more specific types of communications including, but not limited to, Vehicle-to-Infrastructure (V2I), Vehicle-to-Vehicle (V2V), Vehicle-to-Pedestrian (V2P), Vehicle-to-Device (V2D), Vehicle-to-Grid (V2G) and Vehicle to Network (V2N). The system may comprise a plurality of communicatively connected roadside units (RSUs) placed within a defined geographical area. Each RSU may be configured to receive data from processing units of a plurality of sources permanently and/or temporarily located within its respective coverage area forming part of said defined geographical area and to at least transmit said received data and/or data derived from said received data to one or more of said data processing units and/or to other data processing units located within its coverage area. The data processing units may, for example, comprise processing units of vehicles travelling within the coverage area and processing units of local infrastructure devices and systems communicatively connected to said RSU.

When an event occurs within the coverage area of an RSU, a difficulty is encountered in knowing which of other RSUs information relating to the event should be sent. If the information for each event occurring in the coverage area of an event RSU is communicated to all other remaining RSUs, this may waste system resources and create additional signal latencies in the system.

U.S. Ser. No. 10/433,120 discloses a system information block (SIB) in a radio interface which is dedicated to broadcast data intended for Internet of things (IoT) devices. The data can be associated with almost any IoT service, such as, but not limited to, a V2V and/or a V2X service. In one aspect, data, associated with an event, that has been aggregated from one or more IoT devices located within a region can be analyzed to determine a geographical area where a message regarding the event (e.g., accident) is to be broadcast. Further, the message can be dynamically prioritized and/or customized to target a particular class of IoT devices (e.g., connected cars) by employing different message identifiers. Real-time analysis of an event to determine a geographical area where a message regarding the event is to be broadcast may increase the latency of broadcasting such a message.

US2018/0213365 discloses a method and apparatus for transmitting information in a wireless communication system. An RSU for V2X communication receives a message indicating an event from a vehicle user equipment (V-UE), and broadcasts information on the event to other V-UEs. Since multiple V-UEs may have transmitted the message regarding the same hazard event, the RSU may first check the duplication of the hazard event and update the information on the hazard event based on the newly received information. For detecting duplication of the hazard event, the location information of the hazard may be used. Real-time analysis to determine duplication of a hazard event may increase the latency of broadcasting messages relating to said duplicated hazard event.

US2016/0285935 discloses that, in some cases, V2X systems may send warning messages about an incident. The warning messages may be sent over short distances, but it may be useful to also send the warning messages over wider distances. Some systems may use Long Term Evolution (LTE) Multimedia Broadcast Multicast Service (MBMS) from a V2X proximity broadcast. Electronic communications devices, such as UEs may be unaware of the MBMS. The RSU receives a V2X message from a UE. The RSU may broadcast information associated with the V2X message. The RSU may send the information associated with the V2X message to a network entity for a point-to-multipoint broadcast. All RSUs will receive information relating to the incident.

Despite the foregoing disclosures, there remains a need for enhancing safety alarm generation and/or threat detection for vehicular road safety and/or management purposes by more efficiently relaying event information from an event RSU to remaining RSUs in the system.

OBJECTS OF THE INVENTION

An object of the invention is to mitigate or obviate to some degree one or more problems associated with known methods of improving vehicular road safety and/or management of vehicles.

The above object is met by the combination of features of the main claims; the sub-claims disclose further advantageous embodiments of the invention.

Another object of the invention is to provide an improved method of relaying event information in a V2X system.

One skilled in the art will derive other objects of the invention from the following description. Therefore, the foregoing statements of object are not exhaustive and serve merely to illustrate some of the many objects of the present invention.

SUMMARY OF THE INVENTION

For enhancing safety alarm generation and/or threat detection accuracy for vehicles, for example, multiple sources of information such as vehicles, pedestrian devices, roadside infrastructure, and communications network(s), etc. are required at low latency signal processing and delivery levels. The present invention provides an end-to-end V2X network system having a multi-tier system architecture which utilizes information and algorithms performed at different tiers of the V2X network system to enable low latency generation of vehicle/road safety alarms and/or low latency determination of vehicle/road threats. More particularly, the present invention provides an improved method and system for relaying event information in a V2X system.

In a first main aspect, the invention provides a method for improving road safety of a vehicle in a system comprising a plurality of communicatively connected roadside units (RSUs) placed within a defined geographical area, each RSU configured to receive data from a plurality of sources located within its respective coverage area forming part of said defined geographical area and to at least transmit said received data and/or data derived from said received data to one or more data processing units located within its coverage area. The method comprises the steps of: receiving data defining an event $E_1$ occurring within the coverage area of an event RSU; determining a type of the event $E_1$; and based on the type of event $E_1$, communicating data defining the event $E_1$ or data related to the event $E_1$ from said event RSU to one or more selected RSUs from remaining RSUs. Preferably, the one or more selected RSUs are pre-selected in accordance with the determined type of the event $E_1$.

In a second main aspect, the invention provides an RSU for improving road safety and/or management of vehicles in a system comprising a plurality of communicatively connected RSUs placed within a defined geographical area, each RSU configured to receive data from a plurality of sources located within its respective coverage area forming part of said defined geographical area and to at least transmit said received data and/or data derived from said received data to one or more data processing units located within its coverage area, the RSU comprising: a non-transitory, computer-readable medium storing machine-executable instructions; and a processor connected to the non-transitory computer-readable medium configured to execute the machine-executable instructions to arrange said RSU to perform the method of the first main aspect of the invention.

In a third main aspect, the invention provides a system for improving road safety and/or management of vehicles, said system comprising: a plurality of communicatively connected RSUs placed within a defined geographical area, each RSU configured to receive data from a plurality of sources located within its respective coverage area forming part of said defined geographical area and to at least transmit said received data and/or data derived from said received data to one or more data processing units located within its coverage area; each RSU comprising: a non-transitory, computer-readable medium storing machine-executable instructions; and a processor connected to the non-transitory computer-readable medium configured to execute the machine-executable instructions to arrange said RSU to perform the method of the first main aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
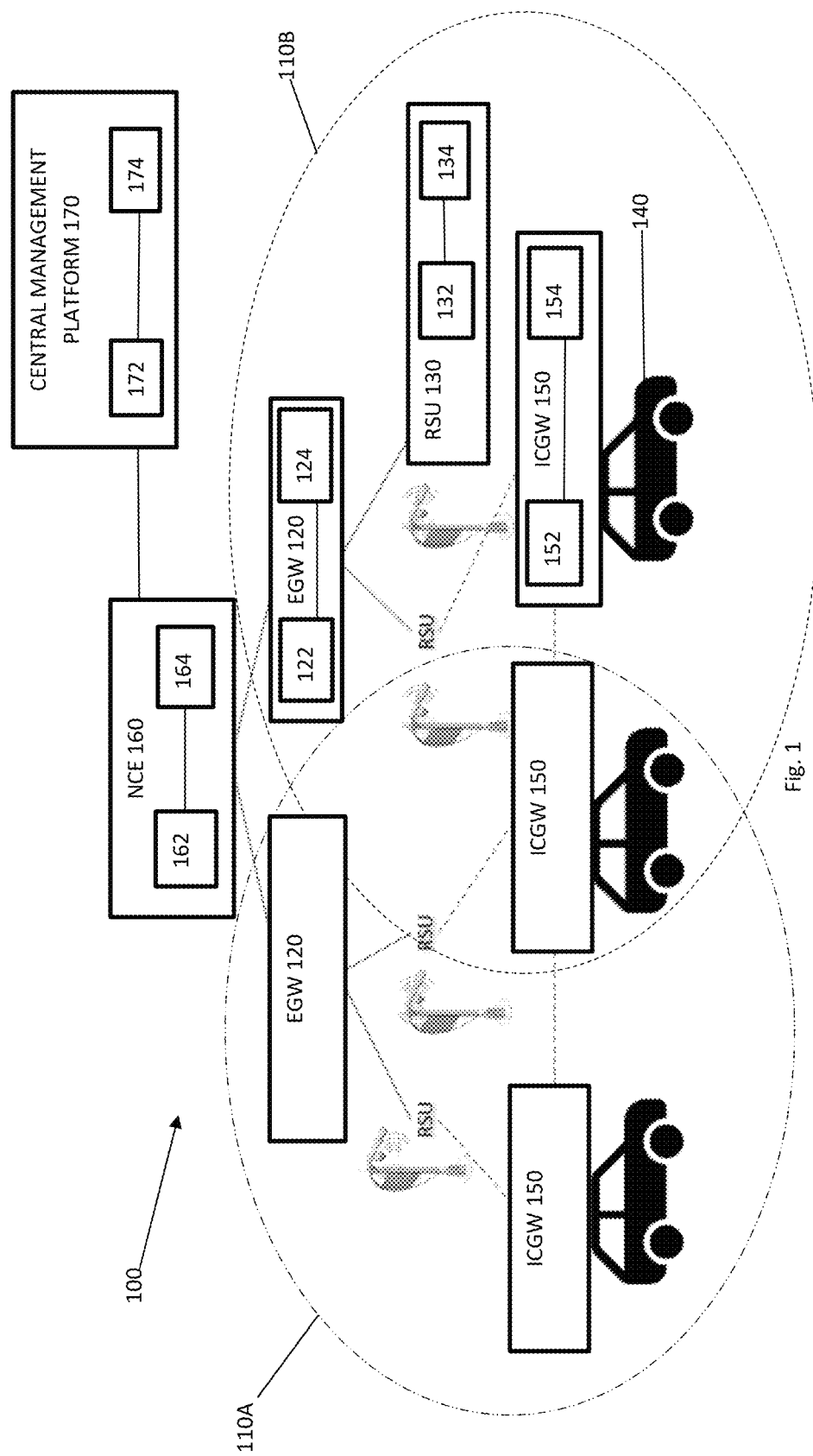
FIG. 1 is a schematic diagram illustrating one embodiment of a system in accordance with the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller"

should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The present invention relates to a method of relaying, e.g. broadcasting, event information from an RSU within whose coverage area an event occurs (hereinafter referred to as the "event RSU") to other RSUs of the system (hereinafter referred to as the "remaining RSUs") in a citywide V2X system. More particularly, the invention provides a mechanism for event RSUs to effectively relay event information to vehicles in defined influence areas or maps in a multi-tier V2X architecture for saving cellular-V2X (C-V2X) network resources and reducing latency of event information transmission.

Referring to FIG. 1, provided is a schematic diagram illustrating a V2X system 100. The system 100 is preferably a communications network-based system 100 arranged as a plurality of defined local geographical areas 110A, B, each defined local geographical area 110A, B being managed by and/or in data communication with a respective edge gateway module (EGW) 120. Each EGW 120 communicates with a respective Network Cooperation Engine (NCE) 160 and each NCE communicates with a central management platform 170 which covers a broader defined geographical area comprising the defined local geographical areas 110A, B.

The defined local geographical areas 110A, B may overlap as shown in FIG. 1, although this is not necessarily the case and it is preferred that any overlaps between adjacent defined local geographical areas 110A, B are arranged to be as small as possible. Each EGW 120 preferably manages and is in communication with a plurality of roadside units (RSUs) 130. Each RSU 130 is preferably arranged alongside, adjacent or near to any one or more of a road, an intersection, a junction, a pedestrian crossing, a set of traffic lights, etc. such that each RSU has a reasonable line of sight to any vehicles located in or passing its near vicinity, although this is not essential. The area covered by the RSU is referred to hereinafter as its "coverage area". The multi-tier V2X system therefore has a broad defined geographical area comprising the defined local geographical areas 110A, B of the EGWs 120 where each defined local geographical area 110A, B comprises a plurality of RSU coverage areas.

Vehicles 140 which are configured to operate within the network system 100 are each provisioned with a vehicle on-board data processing unit—hereinafter referred to as an in-car gateway module (ICGW) 150 but which may also be referred to as an "On-Board Unit" (OBU). The ICGW 150 may be a stand-alone unit configured to be installable into a vehicle 140 or it may comprise an existing data processing unit of the vehicle 140 having a memory 152 storing machine-readable instructions and a processor 154 for executing said instructions to cause the ICGW 150 to implement appropriate method steps of the invention. Each EGW 120 comprises at least a memory 122 for storing machine-readable instructions and a processor 124 for executing said instructions to cause the EGW 120 to implement appropriate method steps of the invention. In a similar manner, each RSU 130 comprises at least a memory 132 for storing machine-readable instructions and a processor 134 for executing said instructions to cause the RSU 130 to implement appropriate method steps of the invention.

Among other things, each ICGW 150 is preferably configured to provide V2X communication system access and information exchange with other ICGWs 150 and road infrastructure in the defined local geographical area 110A, B, to collect data from the vehicle on-board modules such as, for example, the speedometer and satellite positioning system, directly or indirectly exchange vehicle collected data with other local ICGWs 150, RSUs 130 and its respective EGW 120, use the vehicle collected data and data received from other local ICGWs 150, RSUs 130 and EGW 120 to determine threats and generate alarms, etc., and receive and issue V2X alarms and notifications as well as receive traffic status information and recommendations.

Each EGW 120 is preferably configured to at least coordinate multiple RSUs 130 within its respective defined local geographical area 110A, B, monitor traffic in real-time including monitoring traffic congestion and traffic incidents such as accidents, intelligently implement local traffic management, collect data from local infrastructure such as, for example, traffic lights, sensors, cameras, local ICGWs 150 and RSUs 130 and its respective NCE 160, collect policies from its respective NCE 160, and to use collected data to determine threats and generate alarms, etc. Each EGW 120 may be configured to determine from received and processed specific data to be transmitted to a specific ICGW 150 in dependence on data received at said EGW 120 indicative of one or more parameters related to or associated with a vehicle of said specific ICGW 150. For example, a parameter such a street location may be utilized by the EGW 120 to determine which vehicles within its local geographical area 110A, B need to receive a specific alert, alarm, action or indication of threat.

A plurality of EGWs 120 are preferably managed by and/or in data communication with a respective NCE 160 and, in turn, a plurality of NCEs 160 are preferably managed by and/or in data communication with a central management platform module 170. The system 100 may comprise only a single central management platform module 170 to cover a large geographical region such as, for example a city, a county or a state. Each NCE 160 comprises at least a memory 162 for storing machine-readable instructions and a processor 164 for executing said instructions to cause the NCE 160 to implement appropriate method steps of the invention. Similarly, the central management platform module 170 comprises at least a memory 172 for storing machine-readable instructions and a processor 174 for executing said instructions to cause the central management platform module 170 to implement appropriate method steps of the invention.

Each NCE 160 is preferably configured to at least intelligently implement regional traffic management, define and provide new and updated traffic policies to the EGWs 120, and coordinate multiple EGWs 120.

The central management platform module 170 is preferably configured to at least intelligently implement whole network traffic management, define traffic strategies for the NCEs 160 and manage and analyze network wide traffic data. The central management platform module 170 may comprise a cloud-based system and may connect to the NCEs 160 via an IP network such as the internet or a virtual private network (VPN).

It will be appreciated that the processing power of the central management platform module 170 will likely be very considerably greater than the processing power of any of the NCE 160, EGW 120, RSU 130 or ICGW 150. Despite this, it is envisaged that the central management platform module 170 will operate on high latency data and/or on long data processing periods to provide information related to, for example, road/traffic strategy and planning rather than time critical generation of alerts, determination of actions and/or determination of threats as will be performed at the local EGW 120 and RSU 130 level. For enhancing safety alarm generation and/or threat detection accuracy for vehicles, multiple sources of information such as vehicles, pedestrian devices, roadside infrastructure, and communications network(s), etc. are required at low latency signal processing and delivery levels.

The network system 100 comprises a V2X system which preferably utilizes all local available sources of data including, but not limited to vehicle ICGWs 150, pedestrian devices 180 (FIG. 2), road infrastructure systems and devices 190 (FIG. 2) such as traffic lights, traffic cameras, emergency services databases, local authority databases and the like by way of informing EGWs, preferably in real-time, or at least at ultra-low latency, of events, situations or the like which may be relevant to enabling an EGW 120, a RSU 130 and/or a ICGW 150 to determine a threat to a vehicle 140 or another road user and/or to generate an alarm to a vehicle user or another road user.

Figure 2:
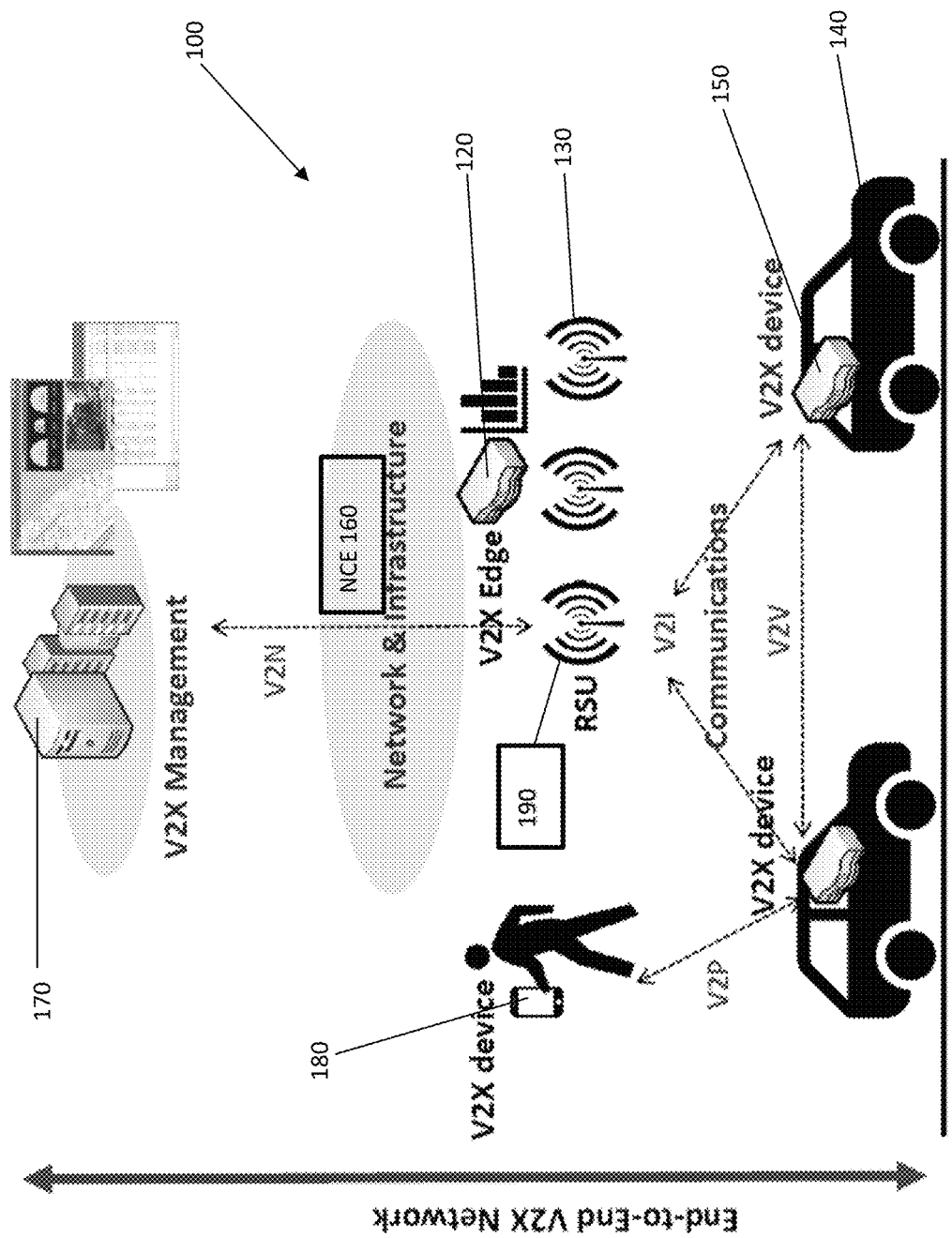
FIG. 2 is a schematic diagram of the system of FIG. 1 showing said system comprising an end to end V2X network.

As shown more clearly in FIG. 2, each ICGW 150 may utilize one or more standard communications interfaces to communicate with other network entities. For example, the ICGW 150 may utilize V2V to exchange data with other ICGWs 150 and/or utilize V2P to exchange data with pedestrian devices 180 and/or utilize V2I to exchange data with local infrastructure including the RSUs 130. The RSUs 130 and EGWs 120 preferably use V2N to exchange data with each other and higher-level network entities such as the NCEs 160 and the central management platform 170 as will be more fully explained hereinafter. Where appropriate, entities in the network system 100 may also utilize V2D and V2G. As such, the system provides, as illustrated by FIG. 2, an end-to-end V2X network system 100 having a multi-tier system architecture which utilizes information and algorithms performed at different tiers of the V2X network system to enable low latency generation of vehicle/road safety alarms and/or low latency determination of vehicle/road threats.

In the V2X network system 100, the EGWs 120 and/or RSUs 130 are configured to process local, real-time and/or low latency data to assist or provide alarms and/or determine threats to road users. The EGWs 120 and/or RSUs 130 will operate on data having a latency of 100 ms or less and preferably 50 ms or less. A low latency is regarded as comprising a data processing and delivery time in the range of for example 10 ms to 100 ms or even lower than 10 ms especially in a 5G system.

By confining processing of local real-time and/or low latency data to respective EGWs 120 and/or RSUs 130 on behalf of or in conjunction with ICGWs 150 and/or user devices 180, this enables the system 100 to provide or enable time-critical alarm generation and/or threat determination at the local level without the delays inherent of processing such data at higher level entities in the network system 100. A size of the defined geographical area 110A, B is selected such as to enable data from said one or more RSUs 130 and/or from a respective EGW 120 to be transmitted to said ICGWs 150 in real-time or at least at or less than a first, low level of latency.

In one embodiment, the V2X network system 100 provides a communications channel for at least providing additional data to ICGWs 150 to use in addition to on-vehicle data to generate alarms, to determine threats and/or to determine control actions for the vehicle to be implemented manually or autonomously. The V2X channel provided by the network system 100 is an efficient method of getting time-critical data to ICGWs 150 from local external sources that may affect the vehicle and vice versa.

Figure 3:
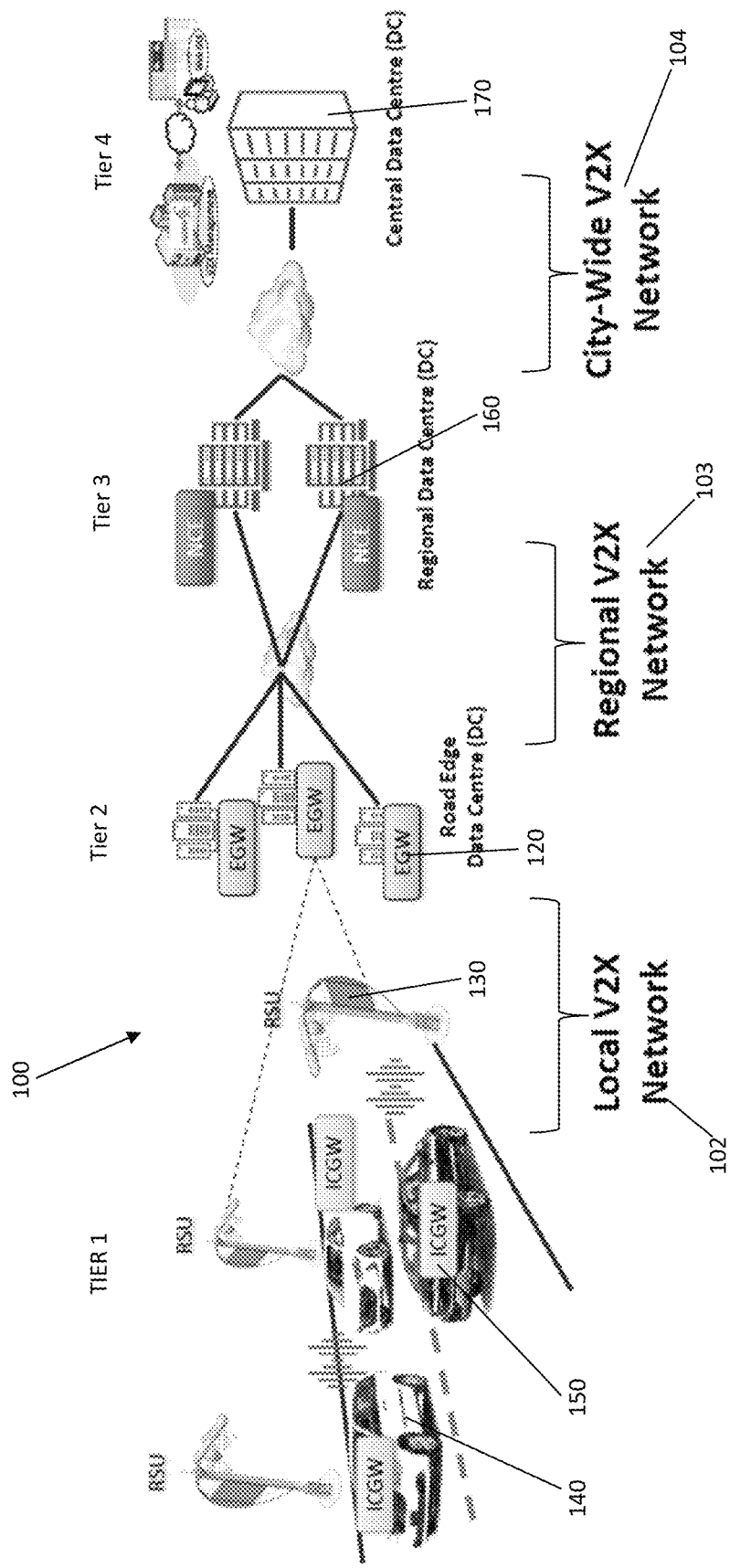
FIG. 3 is a schematic diagram of the system of FIG. 1 showing more clearly the tiered structure of said system.

The multi-tiered arrangement of the network system 100 is more clearly seen from FIG. 3. A first tier can be considered as comprising any vehicles 140 with their associated ICGWs 150 within a geographical area of an EGW 120, any other road users such as pedestrians and their associated devices 180 (FIG. 2), street level infrastructure such as smart traffic lights, camera systems, etc. and the RSUs 130. A second tier of the network system 100 comprises the EGWs 120. The first-tier entities are linked to the second-tier entities by what can be considered as a local V2X network 102 where data communications are exchanged using V2I, V2P and V2V. A third tier of the network system 100 can be considered as comprising the NCEs 160 and these are linked to the second-tier entities by what can be considered as a regional V2X network 103. A fourth tier comprises the central management platform 170 which communicates over a city-wide, county-wide or state-wide V2X network 104.

The first and second tier entities preferably operate at signal latencies of 100 ms or less and preferably at signal latencies of 50 ms or less. The third-tier entities preferably operate at signal latencies of 1000 ms or less whereas the fourth-tier entity operates at latencies of greater than 1000 ms and nearer to several seconds to minutes and even longer time periods. Consequently, the invention generally relates to a multi-tier V2X network architecture or software system to enable low latency road safety V2X alarm detection/threat determination at a local level whilst using information and algorithms performed at different higher-level tiers of the system operating at different, higher latency levels.

Figure 4:
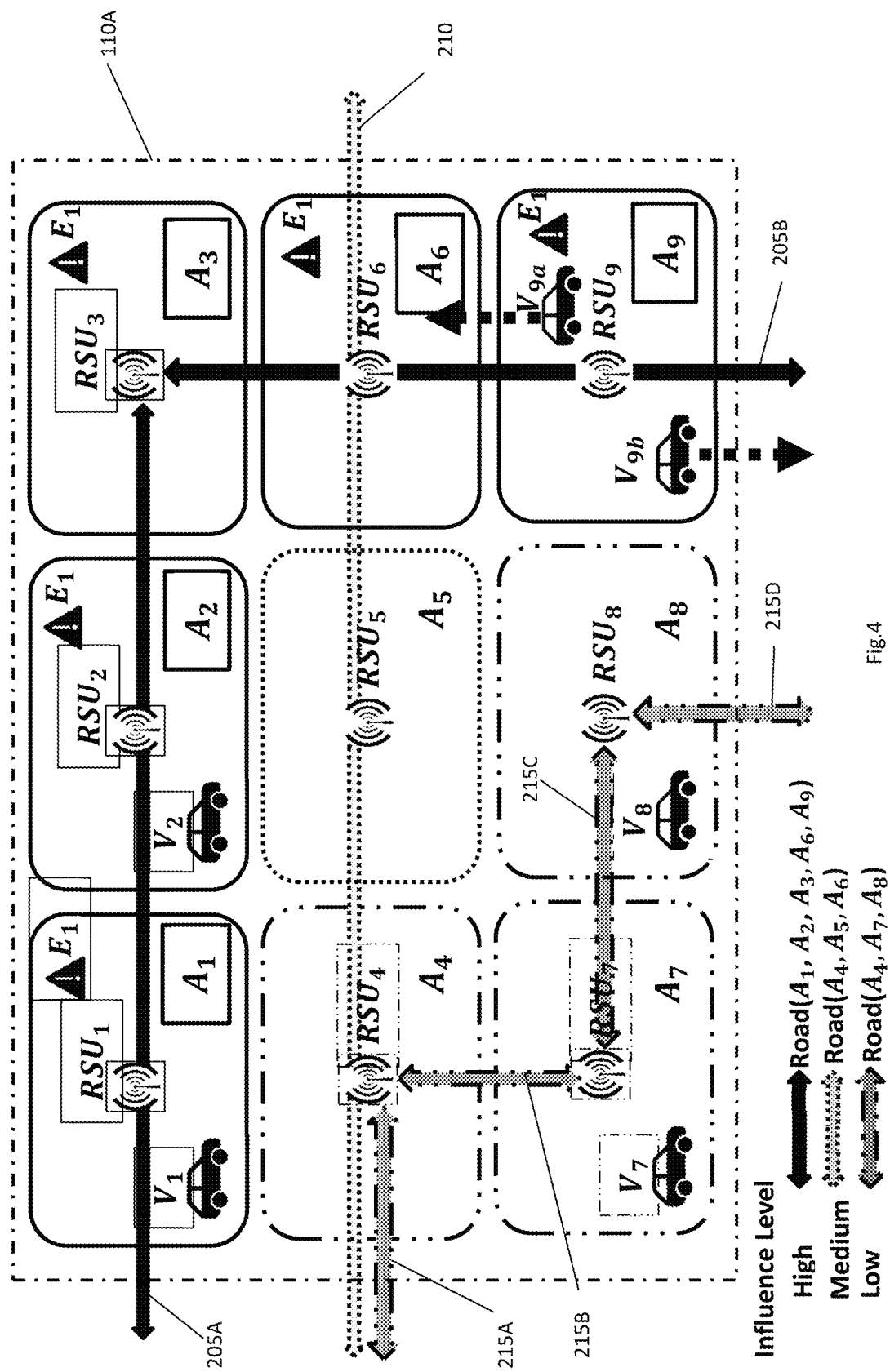
FIG. 4 schematically illustrates a C-V2X network deployment in accordance with the invention.

Reference is now made to FIG. 4 which schematically illustrates a C-V2X network deployment where m RSUs ($RSU_1$, $RSU_2$ . . . $RSU_m$) are deployed in a defined geographical area such as a defined local geographical area 110A (denoted by dashed line box 110A in FIG. 4) of an EGW 120. Each RSU ($RSU_1$, $RSU_2$ . . . $RSU_m$) has its corresponding monitor or coverage area ($A_1, A_2, \ldots A_m$). In the example of FIG. 4, m=9 although it will be understood that this is for illustration purposes only and the number of RSUs in the defined geographical area may be greater or less than 9 in number.

When an event $E_1$ happens and is captured by local infrastructure such as, for example, a roadside sensor (not shown) in coverage area $A_1$ of $RSU_1$, a decision must be made as to which remaining RSUs and/or to which remaining coverage areas should information relating to the event $E_1$ be sent to. The decision may be based on the specific location and time of occurrence of said event $E_1$ but, in the method of the invention, a primary consideration is the type of the event which must therefore be determined. More specifically, will Vehicle $V_2$ under $RSU_2$ in coverage area $A_2$, or Vehicle $V_9$ under $RSU_9$ in coverage area $A_9$ be concerned or interested in the event $E_1$? What effect will the type of the event $E_1$ have on the interest vehicle $V_2$ or vehicle $V_9$ may have in said event $E_1$? If vehicle $V_2$ and vehicle $V_9$ would be interested in said event $E_1$ then $RSU_1$, on receiving information relating to event $E_1$, should send information relating to event $E_1$ to at least $RSU_2$ and $RSU_9$. It would, however, be a waste of C-V2X network resources and create additional latencies in the system if the system were configured to broadcast every event from an event RSU to all remaining RSUs within the citywide V2X system.

FIG. 4 more specifically illustrates that the method of the invention, as described more fully below, can provide graded or scaled influence areas or maps by which an event RSU, e.g. $RSU_1$, can determine which selection of remaining RSUs, e.g. $RSU_2$ to $RSU_m$, to send information to relating to an event $E_1$ within the coverage area of $RSU_1$ in accordance with a determined type of the event $E_1$. As illustrated in FIG. 4, the method of the invention results in, for example, high, medium and low levels of influence for event $E_1$ in coverage area $A_1$ of $RSU_1$. This enables $RSU_1$ to define an influence area or map for the high level of influence comprising coverage areas $[A_1, A_2, A_3, A_6, A_9]$ and/or RSUs $[RSU_1, RSU_2, RSU_3, RSU_6, RSU_9]$. The medium level of influence may result in an influence area or map comprising coverage areas $[A_4, A_5, A_6]$ and/or RSUs $[RSU_4, RSU_6, RSU_6]$. The low level of influence may result in an influence area or map comprising coverage areas $[A_4, A_7, A_8]$ and/or RSUs $[RSU_4, RSU_7, RSU_8]$. Preferably, the coverage areas of the RSUs do not overlap.

In the example of FIG. 4, the defined high, medium and low influence areas or maps for event $E_1$ having a determined type occurring in the coverage area $A_1$ of $RSU_1$ may be better understood if it is considered, by way of example, that arrowed lines 205A and 205B in FIG. 4 represent a major roadway or route whilst arrowed line 210 represent a less important or minor roadway or route which has a junction with the roadway or route of arrowed lines 205A and 205B, whereas arrowed lines 215A-D represent a minor route with no immediate junction with the roadway or route of arrowed lines 205A and 205B. It will be understood therefore that an event $E_1$ in coverage area $A_1$ of $RSU_1$ is much more likely to have an impact on the roadway or route of arrowed line 210 than the route of arrowed lines 215A-D. It follows therefore that, dependent on the type of event $E_1$ occurring in the coverage area $A_1$ of $RSU_1$, vehicles on the route of arrowed lines 205A and 205B will likely have a high interest in said event $E_1$, that vehicles on the route of arrowed line 210 will also likely have an interest in said event $E_1$ but to less of an extent than the vehicles on the major route 205A-B and vehicles on the minor route 215A-D may have little or no interest or concern of any impact on them of event $E_1$ occurring in the coverage area $A_1$ of $RSU_1$.

It will be understood, however, that a measure of influence is not linked or limited to the relative significance of a roadway or route. For example, where a major highway passes through a local area but has no immediate junctions with the local roadways of said local area then an event occurring in the local area may have little or no impact on vehicles traveling through on said major highway. In such an example, vehicles travelling on the major highway would have little or no interest in the locally occurring event.

Preferably, each vehicle in the V2X system communicates a selected route it intends to travel. The vehicle predefined route information provides a means of monitoring the statuses of vehicles in the system by comparing the actual routes they travel to the predefined route information. Deviations from predefined routes may be processed by the system to determine the effects and thus the interests the vehicles may have on events which may have caused such deviations.

An event could be of many different types and comprise anything monitored or detected by an RSU or reported to an RSU by local infrastructure such as sensor and/or by vehicles, etc. An event could comprise such things as, but not limited to a vehicle breakdown, a vehicle collision with another vehicle or road infrastructure, a pedestrian crossing a road at an illegal position, a vehicle violating road traffic laws, specific weather conditions such as heavy rain, ice, snow, fog, etc.

When an event occurs, preferably its event type, position such as GPS coordinates, street location, etc., and time is collected as comprising some of the event information to be relayed by an event RSU to one or more remaining RSUs or from which data can be derived for relaying by an event RSU to one or more remaining RSUs. It will be understood that other meaningful data in addition to the foregoing may be collected for an event. Most importantly, however, is the determination of the type of the event as events of different types will have respectively different impacts on other road users.

An important aspect of the method of the invention is that a preselection of remaining RSUs may be made by an event RSU once the event RSU has determined the type of an event reported to it. This enables the event RSU to relay appropriate information of the determined event according to its type to the preselected set of remaining RSUs relating to the determined type of the event with low latency which is desirable. However, the method of the invention is preferably able to characterize a new or first-time event and to define a selection of remaining RSUs at an event RSU for the new type of event.

Figure 5:
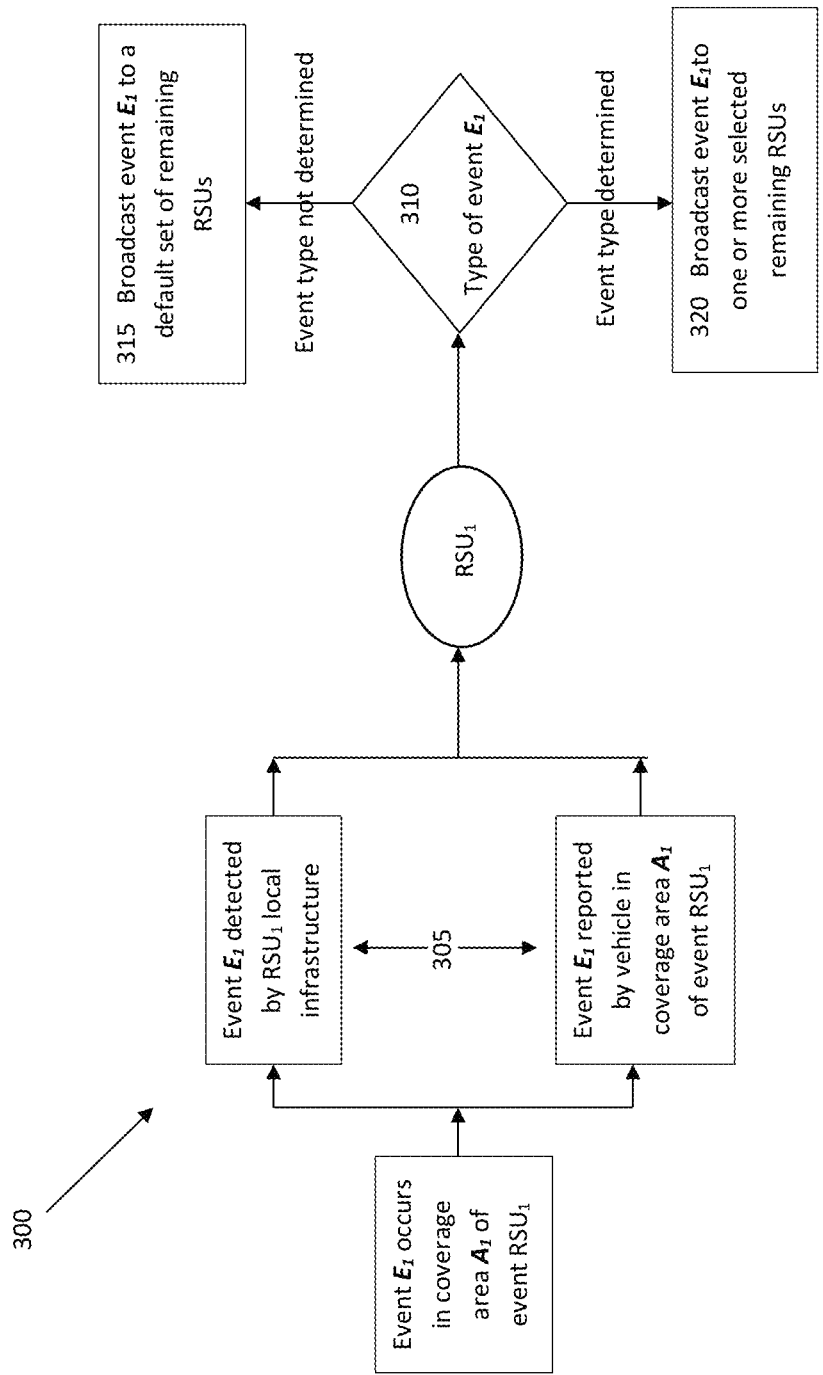
FIG. 5 is a work-flow diagram illustrating processing of an event at an event RSU in accordance with the invention.

Referring to FIG. 5, there is provided a work-flow diagram 300 illustrating processing of an event $E_1$ at an event $RSU_1$. Once an event $E_1$ occurs in the coverage area $A_1$ of the event $RSU_1$, the event $E_1$ is reported at step 305 to the event $RSU_1$. Step 305 may be performed by, for example, a vehicle within the coverage area $A_1$ of the event $RSU_1$ and/or by a roadside sensor within the coverage area $A_1$ of the event $RSU_1$. The event $RSU_1$ is configured, at decision box 310, to determine a type of the event. This may be achieved by the event $RSU_1$ assessing the information received about the event $E_1$ against data stored in a look-up table or a relational database defining event types. In other embodiments, the type of the event $E_1$ may be included in the reporting data received at the event $RSU_1$ in step 305. Or the event $E_1$ may be a new type of event, i.e. a type of event not previously encountered at the event $RSU_1$.

In the case where the event $RSU_1$ is unable to determine the type of the event $E_1$, it is configured to, at step 315, communicate, e.g. broadcast, the received information for the event $E_1$ or data derived from the received information for the event $E_1$ to a default set of remaining RSUs for at least the purpose of obtaining feedback about the event $E_1$ from said default set of remaining RSUs as will be more fully described below. The feedback from the default set of remaining RSUs is intended to enable the event $RSU_1$ to determine the interest the default set of remaining RSUs has in the event $E_1$ to define, establish or generate an influence level, area or map for the newly defined type of event $E_1$.

Data defining a remaining RSU's interest in the determined event $E_1$ is preferably derived from data defining respective interests in the determined event $E_1$ of on-board data processing units of suitably equipped vehicles located within the coverage area of said remaining RSU.

The default set of remaining RSUs for step 315 may be predetermined by a system operator, may comprise all remaining RSUs of RSU coverage areas contiguous with the coverage area $A_1$ of the event $RSU_1$, or may comprise some or all remaining RSUs meeting one or more predefined criteria. Later case, the one or more predefined criteria may comprise any remaining RSUs within a predefined range or distance of the event $RSU_1$.

Once the event $RSU_1$ has determined a new type of event, it may initiate one or more of the remaining RSUs to register the new type of event and preferably to do so such that said one or more of the remaining RSUs are initiated to generate their own influence area or map for said new type of event.

In the case where the event $RSU_1$ is able to determine the type of the event $E_1$ at decision box 310, it is configured to, at step 320, communicate, e.g. broadcast, the received information for the event $E_1$ or data derived from the received information for the event $E_1$ to one or more selected RSUs from the remaining RSUs. Preferably, the one or more selected RSUs from the remaining RSUs is predefined in accordance with the type of the event $E_1$ such that the event $RSU_1$ is able to communicate the received information for the event $E_1$ or data derived from the received information for the event $E_1$ to said selected one or more remaining RSUs with low latency. The event $RSU_1$ may store a predefined or predetermined set of event types and their associated predefined or predetermined selections of the remaining RSUs represented by respective influence areas or maps.

The event $RSU_1$ is preferably configured to determine the selected RSUs from the remaining RSUs based on an influence area or map associated with the type of the event $E_1$ determined at said event $RSU_1$. The influence area or map is preferably modified dynamically at the event $RSU_1$ in response to feedback data received by the event $RSU_1$ from one or more of the selected RSUs.

As already described, the influence area or map associated with the type of the event $E_1$ determined at said event $RSU_1$ may comprise one of a hierarchy of influence area or maps at said event RSU, where each level of the hierarchy defines a respective influence area or map identifying one or more selected RSUs from said remaining RSUs. The set of hierarchy or graded influence area or maps may comprise a primary influence area or map comprising the map area defined for determined event $E_1$ encompassing remaining RSUs reporting interest values $I_{E1}$ in determined event $E_1$ above a predetermined or calculated level, a secondary influence area or map comprising a map area defined for determined event $E_1$ which encompasses some of the remaining RSUs reporting interest values $I_{E1}$ in determined event $E_1$ below the predetermined or calculated level but above a lower predetermined or calculated secondary level, and a tertiary influence area or map comprising a map area defined for determined event $E_1$ which encompasses some of the remaining RSUs reporting interest values $I_{E1}$ in determined event $E_1$ below the lower predetermined or calculated secondary level. Preferably, none of the primary, secondary or tertiary influence areas or maps overlap. There may be an upper limit on the number of hierarchy levels of the graded influence areas or maps. For example, the system may set a limit of 5 levels of hierarchy for the influence areas or maps.

In both of steps 315 and 320, the event $E_1$ information is preferably communicated only to the default set of remaining RSUs or the one or more selected remaining RSUs to reduce or minimize use of resources in the V2X system.

In both of steps 315 and 320, it is preferred that each of the remaining RSUs receiving information relating to the event $E_1$ in coverage area $A_1$ of the event $RSU_1$ communicates the information relating to the event $E_1$ to all suitably equipped vehicles in their respective coverage areas. This enables the vehicles to modify their route or make other modifications to their intended travel plans based on the event $E_1$ information. It also enables each of the vehicles to provide feedback based on the event $E_1$ information including their level of interest in the event $E_1$.

Figure 6:
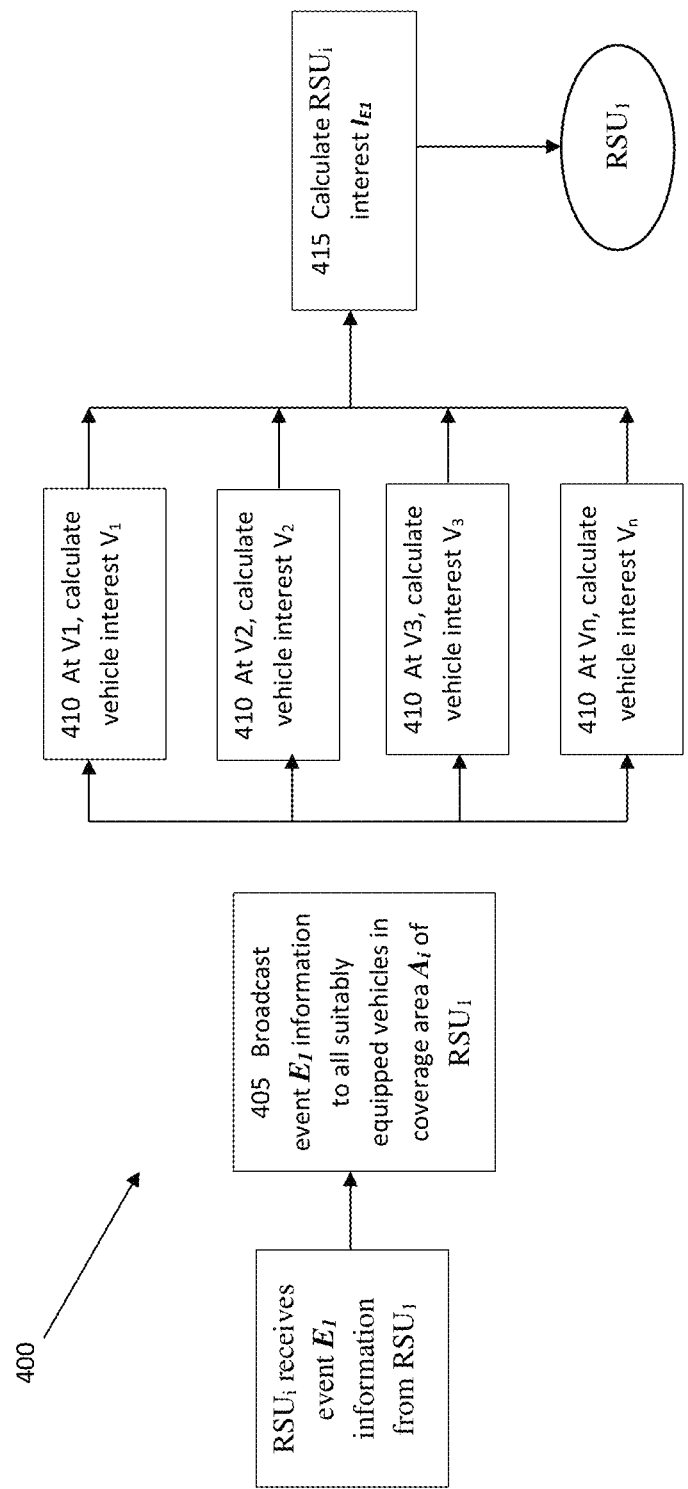
FIG. 6 is a work-flow diagram illustrating the processing of received event information at a remaining RSU in accordance with the invention.

FIG. 6 provides a work-flow diagram 400 illustrating the processing of received event $E_1$ information at one of the remaining RSUs and how the remaining RSU, calculates its interest $I_{E1}$ in the event $E_1$ for feeding back to the event $RSU_1$.

Following step 315 or step 320 of FIG. 5 where the event $E_1$ information has been broadcast by the event $RSU_1$ to either a default set of the remaining RSUs (step 315) or to one or more selected remaining RSUs (step 320), the remaining $RSU_j$, on receiving the event $E_1$ information, communicates, e.g. broadcasts, in step 405, the event $E_1$ information to all suitably equipped vehicles (V1, V2, V3, ... Vn) in its coverage area $A_j$. At step 410, each vehicle calculates its interest ($V_i$) in the event $E_1$ based on the received event $E_1$ information and communicates its interest ($V_i$) in the event $E_1$ to its respective remaining $RSU_j$. Then at step 415, the remaining RSU, calculates its interest $I_{E1}$ in the event $E_1$ based on the collected interests ($V_1$, $V_2$, $V_3$, ... $V_n$) of the vehicles (V1, V2, V3, ... Vn) and communicates its interest $I_{E1}$ back to the event $RSU_1$.

The ICGW 150 of each vehicle may define its interest ($V_1$) in the event $E_1$ according to:

$$V_1 = C_i * b_{ri} * t_{ri}$$

where suffix "i" identifies vehicle i in the coverage are of the remaining RSU;

C is a measure or ratio of a change in behaviour of the vehicle in response to the determine event $E_1$;

$b_r$ is a measure or ratio of the behaviour type; and $t_r$ is a measure or ratio of trust or confidence in the decision.

The ICGW 150 of each vehicle is provided with access to all statistics and statuses of the vehicle, such as signals from, for example, its Controller Area Network (CAN) bus indicating the vehicle's speed, all light conditions, in-vehicle sensor information, etc. It is assumed that the ICGW 150 is also aware of the vehicle's planned route so that it will immediately be notified when the route is changed from the planned route. If the vehicle is controlled by an autonomous driving module, the ICGW 150 preferably has a direct communication interface to the autonomous driving module, which will provide feedback to the ICGW 150 if any behaviour is triggered by a decision made based upon the information concerning event $E_1$.

It will be understood that there could be many different kinds of behavior triggered by the event $E_1$ in the vehicle, each of these being measured in 3 dimensions.

As mentioned above, C represents the type of the behaviour. It has a double value between 0 and $1.0 <= C <= 1$, for example, slowing the vehicle down is a behaviour and its C value can be set to, for example, 0.8, whereas change of target/planned route may be set at 1 as it is a more important behaviour change. Light changes in generally are considered minor behaviour changes and so could have a value of C set to, for example, 0.5.

$b_r$ is the ratio of the behaviour, as some behaviours have their own change ratios. $b_r$ may have a double value between 0 and 1, i.e. $0 <= b_r <= 1$. For example, slowing the vehicle down from say 80 KM/h to 0 in 2 seconds will be considered a dramatic change with $b_r=1$. Switching on of the vehicle emergency flash lights is considered much more significant than switching on the vehicle headlights such that $b_r$ for the emergency flash light switch on event is set to 1 whereas switching on the high beam could be set to $b_r=0.5$.

$t_r$ is the ratio of trust or confidence of the decision. It can have a double value between 0 and 1, i.e. $0<=t_r<=1$. Normally, a ratio of $t_r$ is higher for decisions made by a more autonomous vehicle. For example, an autonomous vehicle may decide to make a change in behaviour after judging the event's influence in, for example, a decision theory model. This decision is purely made by the vehicle's intelligence, e.g. ICGW 150, and it could have a high $t_r$ value like 0.9. If a behaviour is monitored by the ICGW 150 after it sends an alarm to the driver, then the ICGW 150 may be considered as not confident about whether the behaviour is triggered by the event. In such an instance, it could or even should set $t_r$ value to 0.5 to represent its level of trust in the decision.

Note that multiple behaviors could be triggered by an event. It is preferred that $V_1$ will be calculated as a sum of all $C_j*b_{rj}*t_{rj}$ when behaviour j is triggered by event $E_1$.

$$\text{If } \Sigma C_j*b_{rj}*t_{rj}=C_1*b_{r1}*t_{r1}+C_2*b_{r2}*t_{r2}+\ldots +C_j*b_{rj}*t_{rj}>1, V_i=1$$

$$\text{Else } V_i=\Sigma C_j*b_{rj}*t_{rj}$$

$V_i$ is a double value between 0 and 1, i.e. $0<=V_i<=1$.

Furthermore, it should be noted that the above way of calculating interest $V_i$ is one possible means of doing so but other suitable methods may be implemented. It is only necessary that any suitable method of calculating interest $V_i$ using the above of different interest is consistently applied throughout the system to all RSUs and vehicles. This will not affect the essence of the present invention.

For example, if a vehicle on a highway is notified by its RSU of, for example, a weather event such as fog in its path in about 2 km, the vehicle ICGW 150 may control the vehicle to perform one or more of a number of actions or behaviours including, but not limited to: (i) slowing down; (ii) turning on all appropriate lights; (iii) transmitting a V2V message alarm to other vehicles especially those that are following it; and (iv) determining a "Get-Out" path as quickly as possible. In this instance, the weather event comprising fog as a detected event $E_1$ has a high impact on the nearby RSUs and their corresponding vehicles and will merit a high interest index or value V.

Each of the remaining RSUs may calculate or define its interest $I_{E1}$ in the determined event $E_1$ according to:

$$I_{E1}=S*t_r*w+V_{max}*u$$

where $E_1$ represents the determined event;

S is a measure or ratio of which may be derived from the most significant statistical change cause by the determined event $E_1$;

$t_r$ is a measure or ratio of trust or confidence by the remaining RSU in the decision;

w is a weight value of a statistical change in the overall interest determination or calculation;

$V_{max}$ is an interest measure or ratio generated from all vehicles in the coverage are of the remaining RSU, e.g. $V_{max}$=maximum value in $(V_1, V_2, V_3, \ldots V_n)$;

u is the weight of the vehicles interest in the overall interest determination or calculation.

A remaining RSU on monitoring its own corresponding area maintains, i.e. continues calculating and updating, a list of the area's statistics. For example, the number of vehicles in the area, the average vehicle speed, the average distance between vehicles, the congestion status, any violations of traffic rule statuses, sensor captured statuses, e.g. noise levels generated from vehicles, etc. These statistics can only be collected and understood at the RSU level. An event $E_1$ may cause statistical changes in the area monitored by the RSU.

S is the statistic change ratio which is normally derived from the most significant statistical change that may be caused by event $E_1$. It also indicates if it is a dramatic change or a minor one. It has a double value between 0 and 1, i.e. $0<=S<=1$ For example, if a traffic congestion event happens after the occurrence of event $E_1$, it can be considered an important statistical change in S with S set to 1. A slowing down of the average speed of all vehicles and/or an increase of vehicle numbers in the monitored area may be considered to have a major status with S set to 0.7.

Note that the statistics not only can reflect negative effects but also can reflect positive impacts. This could also be reflected by S.

$t_r$ is ratio of trust or confidence of the decision. It has a double value between 0 and 1, i.e. $0<=t_r<=1$. A statistic change could happen in response to many different events or reasons. It may sometimes be difficult to determine if some changes are caused by event $E_1$. Along with increased intelligence and computing capability of the remaining RSU and related road infrastructure, $t_r$ and S will become more accurate. If the remaining RSU has no machine intelligence, it can simply be configured to obtain predefined statistical changes that happen after event $E_1$ in one or more time intervals. For such an event RSU, its $t_r$ value may be set low at, for example 0.5 or lower. The remaining RSU may also seek help from its EGW 120 to provide computing power to increase $t_r$, as the calculation of interest is not time critical.

w and u are weight of statistical part interests compared to the vehicle interest.

w and u have values between 0 and 1 and satisfies $w+u=1$ $$\text{So finally, with } I_{E1}=S*t_r*w+V_{max}*u$$

$I_{E1}$ has a value between 0 and 1 representing the remaining RSU's overall interest in event $E_1$, with greater interest in the event leading to a higher $I_{E1}$ value.

Figure 7:
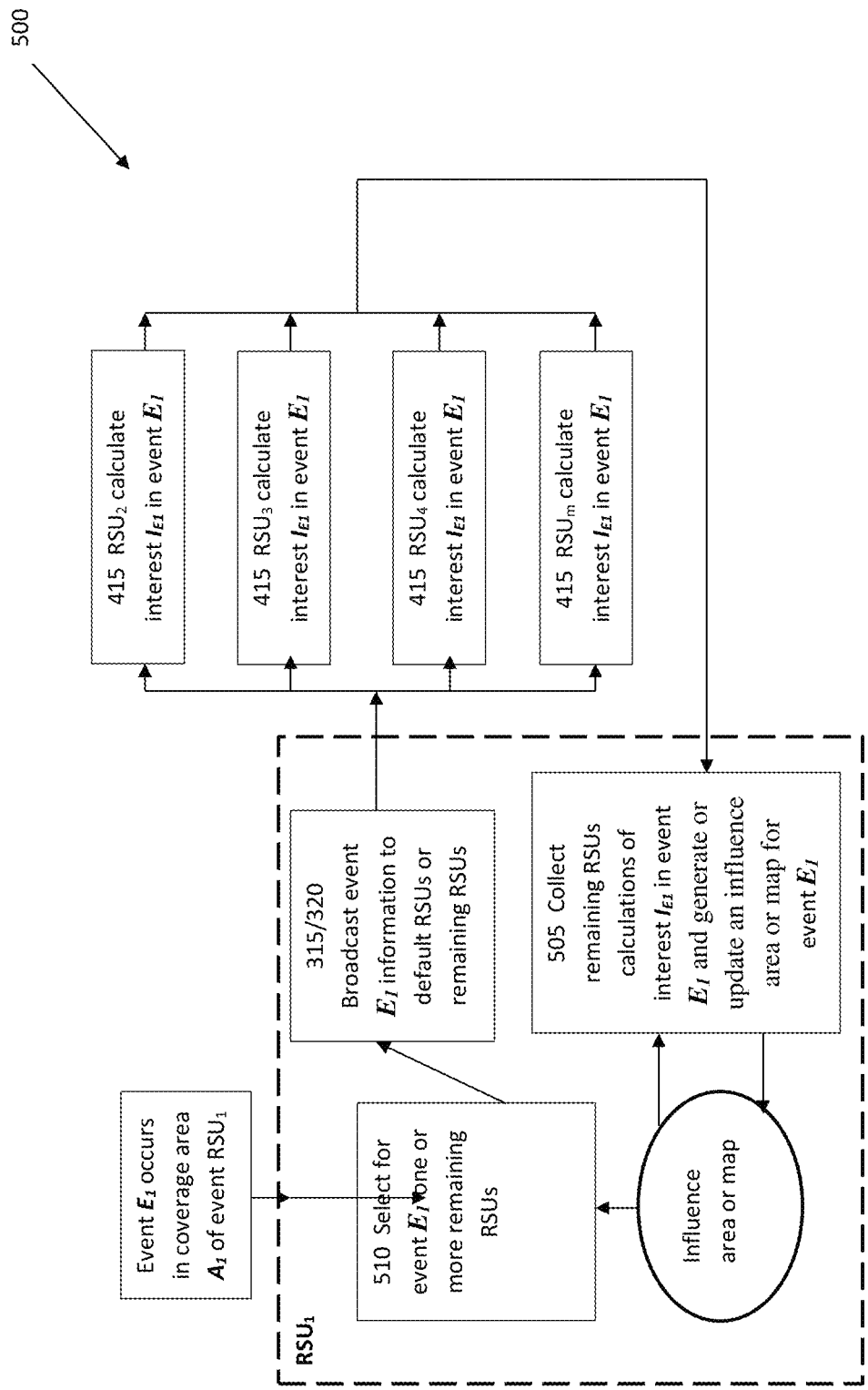
FIG. 7 is a work-flow diagram illustrating the processing steps taken by an event $RSU_1$ to determine an overall interest value in an event in accordance with the invention.

FIG. 7 provides a work-flow diagram 500 illustrating the processing steps taken by the event $RSU_1$ to generate or update an influence area or map for event $E_1$ at the event $RSU_1$. Following step 315 or step 320 of FIG. 5 where the event $E_1$ information has been broadcast by the event $RSU_1$ to either a default set of the remaining RSUs (step 315) or to one or more selected remaining RSUs (step 320) and step 415 of FIG. 7 where each of the remaining RSU, calculates its interest $I_{E1}$ in the event $E_1$, the event $RSU_1$ collects at step 505 said remaining RSU interest values $I_{E1}$ in determined event $E_1$ and generates or updates an influence area or map for determined event $E_1$ by defining an area in said defined geographical area. The event $RSU_1$ may generate said influence area or map by defining a map area which encompasses remaining RSUs reporting interest values $I_{E1}$ in determined event $E_1$ above a predetermined or calculated level and excluding, where appropriate, any remaining RSUs reporting interest values $I_{E1}$ below the predetermined or calculated level. At step 510, the event $RSU_i$, in response to the event type being determined, makes a selection of remaining RSUs for subsequently broadcasting event information to on the occurrence of an event of the same type.

For example, when the event $RSU_1$ receives an $I_{E1}$ from a remaining RSU, the $I_{E1}$ is compared to a previously received $I_{E1}$ in a predetermined prior time period, e.g. the past 24 hours. A maximum $I_{E1\_Max}$ value within the predetermined prior time period is chosen as an index value on building the influence area or map. $I_{E1\_Max}$ is compared to a predetermined, selected or calculated level and assigns the remaining RSU to an appropriate corresponding level of influence area or map.

It can be seen from FIG. 7 that the event $RSU_1$ may be configured to generate an influence area or map for event $E_1$ at the event $RSU_1$ when the event $RSU_1$ determines that event $E_1$ is a new type of event for which no influence area or map has been generated or defined. However, the event $RSU_1$ may also be configured to update an influence area or map when the event $RSU_1$ determines that event $E_1$ is a known type of event for which an influence area or map already exists. Consequently, the event $RSU_1$ may also be configured to dynamically update an influent area or map for a known event $E_1$.

Figure 8:
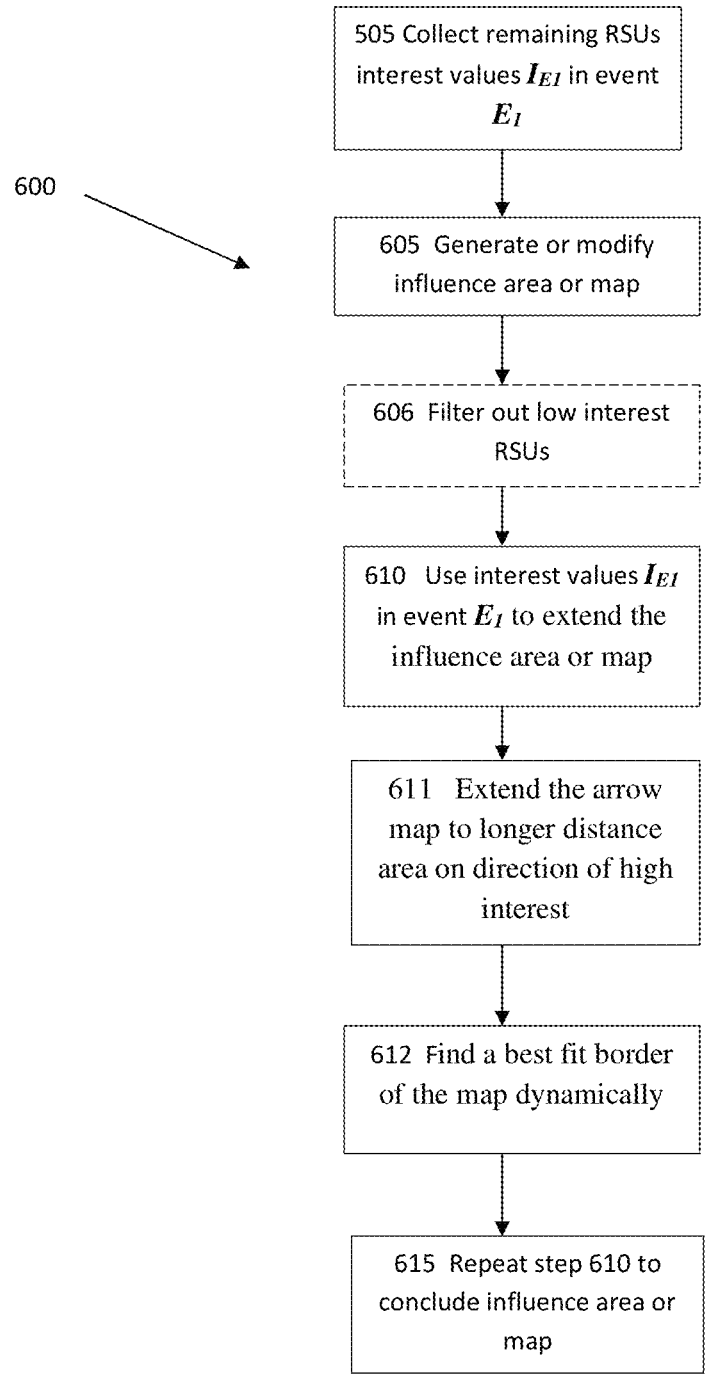
FIG. 8 is a work-flow diagram illustrating a modified process for generating or modifying an influence area or map in accordance with the invention.

FIG. 8 provides a work-flow diagram 600 illustrating a modified process for generating or modifying an influence area or map.

Following step 505 of FIG. 7 where the event $RSU_1$ dynamically collects the remaining RSUs' calculations of interest $I_{E1}$ in event $E_1$, the modified method 600 commences with step 605 where it generates a new influence area or map for a new event or modifies an existing influence area or map for a known event of a determined type. In step 610, the method 600 uses the interest value $I_{E1}$ of remaining RSU, to extend the influence area from the event $RSU_1$ to the remaining RSU, if the interest value $I_{E1}$ of remaining RSU, is above a predefined level. Step 610 is repeated for each remaining RSU, until all of the interest values $I_{E1}$ of remaining RSU, are processed with the result that, at step 615, the influence area or map for the type of event $E_1$ is generated or updated.

In an optional step 606, the method 600 may filter out interest values $I_{E1}$ of remaining RSUs which are below a predefined level.

Other preferred steps include step 611 to extend the arrow map to longer distance area on direction of high interest and step 612 to find a best fit border of the map dynamically.

Every influence map for a new event type is initiated as a default range area, for example within 5 miles distance of the event $E_1$ at $RSU_1$. With responses from remaining RSUs, an influence map within the 5 miles range will be generated. It is most preferred to extend the influence area out of the default range to find an event type's real impact range and area.

The suggested manner is to link an arrow from $RSU_1$ to a remaining RSU which has a high $I_{E1}$ and extend the influence area along the arrow direction which is a furthest distance from $RSU_1$. On sending the event information of $E_1$ to this extended area, $RSU_1$ is capable of identifying if there are any new remaining RSUs interested in the event. After several rounds of extension, an influence map that shapes the real influence area will be built up.

Based on steps 610 and 611, an influence map is built up. But there is a possibility that a low interest remaining RSU that was filtered out from the map may become interested in the event in the future. To handle this, in step 612, we introduce some dynamic manner to wake up or retest these remaining RSUs. A suggested manner is, after an interval of time, for example 1 month, $RSU_1$ could send the event information of $E_1$ not only to high and median interest remaining RSUs according to the influence map, but also send it to all RSUs in the default area, to trigger a new round of updates on the existing influence map.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of improving road safety and/or management of vehicles in a system comprising a plurality of communicatively connected roadside units (RSUs) placed within a defined geographical area, each RSU configured to receive data from a plurality of sources located within its respective coverage area forming part of said defined geographical area and to at least transmit said received data and/or data derived from said received data to one or more data processing units located within its coverage area, the method comprising the steps of:

receiving data defining an event $E_1$ occurring within the coverage area of an event RSU;

determining a type of the event $E_1$; and based on the type of event $E_1$, communicating data defining the event $E_1$ or data related to the event $E_1$ from said event RSU to one or more selected RSUs from remaining RSUs;

wherein the event RSU determines an influence area or map for a type of the event $E_1$ determined at said event RSU from feedback data received at said event RSU from one or more of the remaining RSUs, wherein said feedback data comprises data defining each of the one or more of the remaining RSUs' interest in the determined event $E_1$, said data defining a remaining RSU's interest in the determined event $E_1$ being derived from data defining respective interests in the determined event $E_1$ of on-board data processing units of vehicles located within the coverage area of said remaining RSU;

wherein an on-board data processing unit of a vehicle located within the coverage area of said remaining RSU defines its interest $V_i$ in the determined event $E_1$ according to:

$$V_i = \Sigma C_j * b_{rj} * t_{rj}$$

where suffix "i" identifies vehicle i with behaviour i in the coverage area of the remaining RSU;

C is a measure or ratio of a change in behaviour of the vehicle in response to the determine event $E_1$;

$b_r$ is a measure or ratio of the behaviour type; and $t_r$ is a measure or ratio of trust or confidence in the decision.

2. The method of claim 1, wherein the one or more selected RSUs comprise one or more pre-selected RSUs in accordance with the determined type of event $E_1$.

3. The method of claim 1, wherein the event RSU communicates the data defining the event $E_1$ or the data related to the event $E_1$ to only the selected RSUs.

4. The method of claim 3, wherein each of said selected RSUs communicates the data defining the event $E_1$ or the data related to the event $E_1$ to one or more data processing units located within its coverage area.

5. The method of claim 4, wherein the one or more data processing units include on-board data processing units of vehicles located within the coverage area of an RSU.

6. The method of claim 1, wherein the event RSU determines the selected RSUs from the remaining RSUs based on the influence area or map associated with the type of the event $E_1$ determined at said event RSU.

7. The method of claim 6, wherein the influence area or map associated with the type of the event $E_1$ determined at said event RSU is modified dynamically at the event RSU in response to feedback data received by the event RSU from one or more of the selected RSUs.

8. The method of claim 6, wherein the influence area or map associated with the type of the event $E_1$ determined at said event RSU comprises one of a hierarchy of influence area or maps at said event RSU, each level of the hierarchy defining a respective influence area or map identifying one or more selected RSUs from remaining RSUs.

9. The method of claim 1, wherein, if the event $E_1$ occurring within the coverage area of said event RSU is determined to be a new type of event, the event RSU sends the data defining the event $E_1$ or the data related to the event $E_1$ to a default set of the remaining RSUs and, in response to feedback data received at said event RSU from some or all of said default set of the remaining RSUs, the event RSU determines an influence area or map for said new type of event wherein the influence area or map identifies one or more selected RSUs from remaining RSUs for the new type of event.

10. The method of claim 1, wherein a remaining RSU defines its interest $I_{E1}$ in the determined event $E_1$ according to:

$$I_{E1} = S * t_r * w + V_{max} * u$$

where $E_1$ represents the determined event;

S is a measure or ratio of which may be derived from the most significant statistical change cause by the determined event $E_1$;

$t_r$ is a measure or ratio of trust or confidence by the remaining RSU in the decision;

w is a weight value of a statistical change in the overall interest determination or calculation;

$V_{max}$ is an interest measure or ratio generated from all vehicles in the coverage area of the remaining RSU, e.g. $V_{max}$=maximum value in $(V_1, V_2, V_3, \ldots V_n)$;

u is the weight of the vehicles interest in the overall interest determination or calculation.

11. The method of claim 10, wherein the event RSU receives data defining each remaining RSU's interest value $I_{E1}$ in determined event $E_1$ and uses said data to define the influence area or map for determined event $E_1$.

12. The method of claim 11, wherein the influence area or map may comprise a set of graded influence area or maps, said set of graded influence area or maps comprising a primary influence area or map comprising the map area defined for determined event $E_1$ encompassing remaining RSUs reporting interest values $I_{E1}$ in determined event $E_1$ above the predetermined or calculated level and a secondary influence area or map comprising a map area defined for determined event $E_1$ which encompasses some of the remaining RSUs reporting interest values $I_{E1}$ in determined event $E_1$ below the predetermined or calculated level but above a lower predetermined or calculated secondary level.

13. The method of claim 12, wherein the primary influence area or map area does not overlap the secondary influence area or map area.

14. The method of claim 12, wherein the set of graded influence area or maps comprises a tertiary influence area or map comprising a map area defined for determined event $E_1$ which encompasses some of the remaining RSUs reporting interest values $I_{E1}$ in determined event $E_1$ below the lower predetermined or calculated secondary level.

15. A roadside unit (RSU) comprising an event RSU for improving road safety and/or management of vehicles in a system comprising a plurality of communicatively connected RSUs placed within a defined geographical area, each RSU configured to receive data from a plurality of sources located within its respective coverage area forming part of said defined geographical area and to at least transmit said received data and/or data derived from said received data to one or more data processing units located within its coverage area, the event RSU comprising:

a non-transitory, computer-readable medium storing machine-executable instructions; and a processor connected to the non-transitory computer-readable medium configured to execute the machine-executable instructions to arrange said event RSU to:

receive data defining an event $E_1$ occurring within the coverage area of the event RSU;

determine a type of the event $E_1$; and based on the type of event $E_1$, communicate data defining the event $E_1$ or data related to the event $E_1$ from said event RSU to one or more selected RSUs from remaining RSUs;

wherein the event RSU determines an influence area or map for a type of the event $E_1$ determined at said event RSU from feedback data received at said event RSU from one or more of the remaining RSUs, wherein said feedback data comprises data defining each of the one or more of the remaining RSUs' interest in the determined event $E_1$, said data defining a remaining RSU's interest in the determined event $E_1$ being derived from data defining respective interests in the determined event $E_1$ of on-board data processing units of vehicles located within the coverage area of said remaining RSU;

wherein an on-board data processing unit of a vehicle located within the coverage area of said remaining RSU defines its interest $V_i$ in the determined event $E_1$ according to:

$$V_i = \Sigma C_j * b_{rj} * t_{rj}$$

where suffix "i" identifies vehicle i with behaviour i in the coverage area of the remaining RSU;

C is a measure or ratio of a change in behaviour of the vehicle in response to the determine event $E_1$;

$b_r$ is a measure or ratio of the behaviour type; and $t_r$ is a measure or ratio of trust or confidence in the decision.

16. A system for improving road safety and/or management of vehicles, said system comprising:

a plurality of communicatively connected RSUs placed within a defined geographical area, each RSU configured to receive data from a plurality of sources located within its respective coverage area forming part of said defined geographical area and to at least transmit said received data and/or data derived from said received data to one or more data processing units located within its coverage area; each RSU comprising:

a non-transitory, computer-readable medium storing machine-executable instructions; and a processor connected to the non-transitory computer-readable medium configured to execute the machine-executable instructions to arrange said RSU to:

receive data defining an event $E_1$ occurring within the coverage area of an event RSU;

determine a type of the event $E_1$; and based on the type of event $E_1$, communicate data defining the event $E_1$ or data related to the event $E_1$ from said event RSU to one or more selected RSUs from remaining RSUs;

wherein the event RSU determines an influence area or map for a type of the event $E_1$ determined at said event RSU from feedback data received at said event RSU from one or more of the remaining RSUs, wherein said feedback data comprises data defining each of the one or more of the remaining RSUs' interest in the determined event $E_1$, said data defining a remaining RSU's interest in the determined event $E_1$ being derived from data defining respective interests in the determined event $E_1$ of on-board data processing units of vehicles located within the coverage area of said remaining RSU;

wherein an on-board data processing unit of a vehicle located within the coverage area of said remaining RSU defines its interest $V_i$ in the determined event $E_1$ according to:

$$V_i = \Sigma C_j * b_{rj} * t_{rj}$$

where suffix "i" identifies vehicle i with behaviour i in the coverage area of the remaining RSU;

C is a measure or ratio of a change in behaviour of the vehicle in response to the determine event $E_1$;

$b_r$ is a measure or ratio of the behaviour type; and $t_r$ is a measure or ratio of trust or confidence in the decision.

* * * * *